S. E. GILBERT.
AUTOMOBILE TRAFFIC SIGNAL.
APPLICATION FILED JUNE 30, 1916.
1,266,454.
Patented May 14, 1918.
2 SHEETS—SHEET 1.
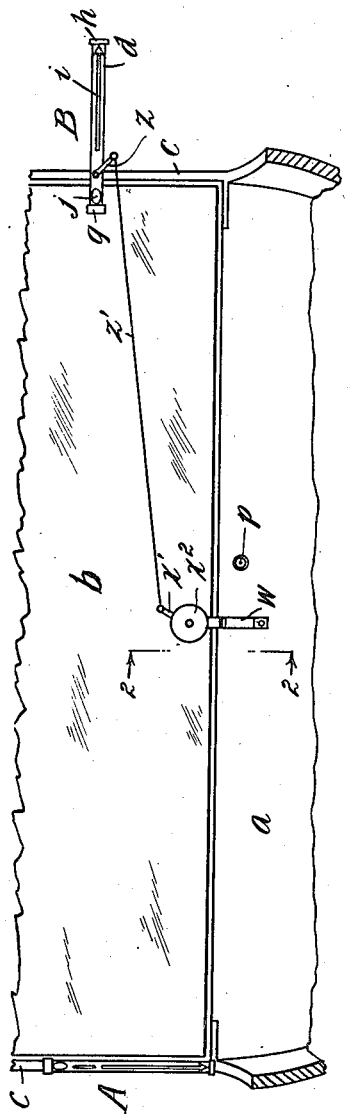
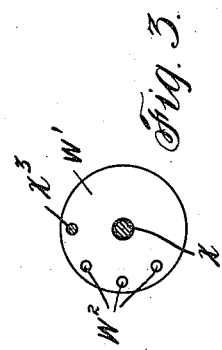
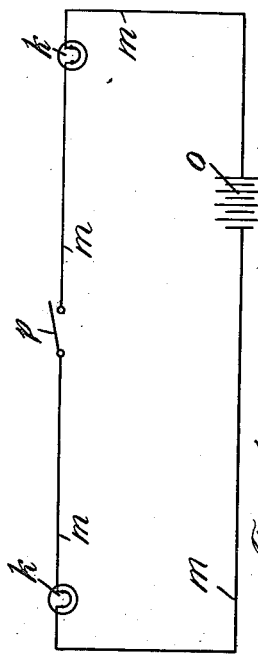
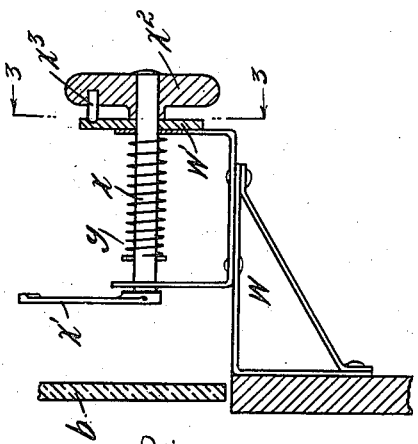
INVENTOR
Samuel E. Gilbert.
BY
ATTY.

S. E. GILBERT.
AUTOMOBILE TRAFFIC SIGNAL.
APPLICATION FILED JUNE 30, 1916.

1,266,454.

Patented May 14, 1918.
2 SHEETS—SHEET 2.

INVENTOR
Samuel E. Gilbert.
BY
T. J. Geisler
ATTY.

UNITED STATES PATENT OFFICE.

SAMUEL E. GILBERT, OF PORTLAND, OREGON.

AUTOMOBILE TRAFFIC-SIGNAL.

1,266,454.  Specification of Letters Patent.  Patented May 14, 1918.

Application filed June 30, 1916. Serial No. 106,990.

*To all whom it may concern:*

Be it known that I, SAMUEL E. GILBERT, a citizen of the United States, and a resident of the city of Portland, county of Multnomah, State of Oregon, have invented a new and useful Improvement in Automobile Traffic-Signals, of which the following is a specification.

This invention relates generally to traffic signals for automobiles, and has particularly to do with an improved form of semaphore signal arm by means of which the driver of an automobile may transmit selected signals to pedestrians or other automobiles.

The main object of my invention is to provide an improved form of signal arm, adapted to night illumination, which may be readily placed in operative state by the driver of an automobile, the function of the arm being to indicate that a turn or stop is to be made. If the automobile is operating as a 'bus, the signal may also be set so as to indicate such fact. It is further the object of my invention to so arrange this arm as to permit its use at night, either as a signal arm or as a side light for the automobile.

The features of my invention are fully shown in the accompanying drawings, in which:

Figure 1 is a fragmental rear elevation of the windshield and dashboard of an automobile, showing my signaling devices installed thereon and so positioned as to signal that the automobile is to turn to the right;

Fig. 2 is an enlarged sectional detail taken on the line 2—2 of Fig. 1;

Fig. 3 is a section on the line 3—3 of Fig. 2;

Fig. 4 is a diagram of the signal electric lighting system;

The dashboard of the automobile is represented by $a$, $b$ is the wind-shield, and $c$, $c$ are the wind-shield supporting standards.

Figure 5:
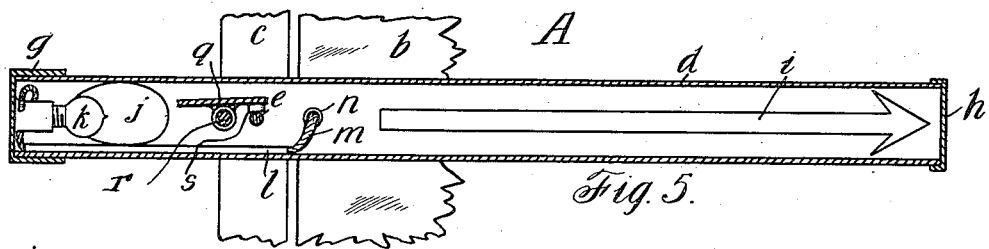
Fig. 5 is a vertical section of the left hand signal, showing it positioned for serving as a side light.
Figure 8:
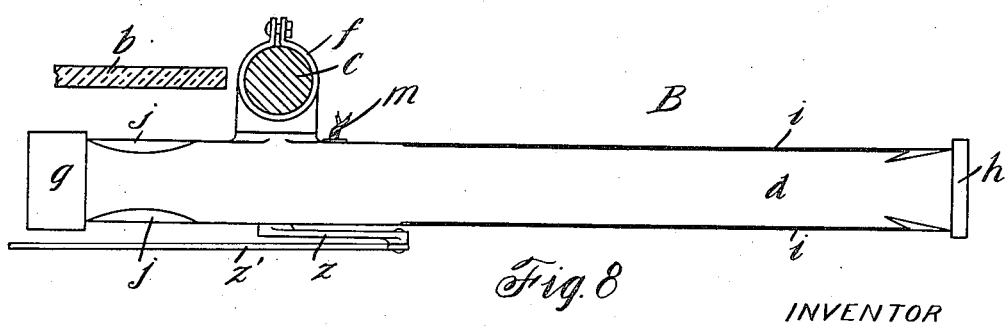
Fig. 8 is a plan view of the right-hand signal.

Assuming that the automobile is a left-hand drive, the left signal arm A will be so located that the driver can reach it directly from his seat, while the right hand signal arm B is operated by auxiliary control devices. Obviously, this arrangement would be reversed on a right-hand drive automobile. Each signal arm comprises a tube $d$, pivotally mounted on a stud $e$, of a base clamp $f$, the latter adapted for attachment to the wind-shield standards $c$. The extremities of this tube are provided with caps $g$, $h$. One end is provided with companion fore and rear openings $i$, shaped as an arrow, and the other end is provided with oblong openings $j$, said openings are closed by transparent material, such as isinglass, preferably colored red. An electric-light bulb $k$ is mounted in the cap $g$, and a conduit $l$ carries the conductors $m$ to an entrance opening $n$, located near the center of rotation of the arm. The lights $k$ in the two signals are connected in series as shown in Fig. 4, the energizing element being indicated by $o$, and a control switch by $p$. This circuit is closed only for night driving. Normally, the light from the bulb $k$ would illuminate both openings $i$, $j$, but I provide an automatic shutter $q$ which excludes the light from the openings $i$ when the arm is in certain positions. This shutter $q$ is pivoted on a pintle $r$, and is weighted on one side, as shown by $s$, see Fig. 5. In this way, when the arm points out, the shutter will open until the weighted side rests upon the stud $e$, and the arrows will be illuminated, as in Fig. 8. When, however, the arm points inwardly, the openings $j$ only will be illuminated, and will serve as night lights.

Figure 6:
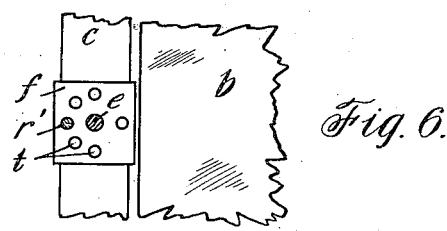
Fig. 6 is a sectional view on the line 6—6 of Fig. 7.
Figure 7:
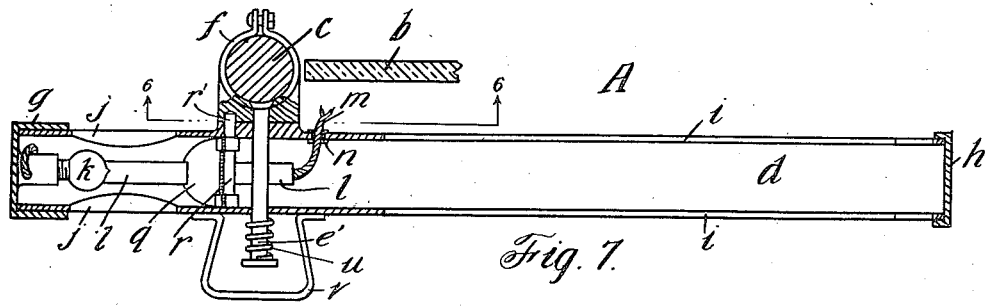
Fig. 7 is a horizontal section of the parts shown in Fig. 5.

In the signal arm A is a stud $e$, made with an extension $e'$, and the pintle $r$ with an extension $r'$. The base clamp $f$ is provided with a plurality of arcuate holes $t$ (see Fig. 6) with which the pintle extension $r'$ is adapted to engage, so as to lock the arm in any position to which adjusted. A compression coil-spring $u$, encircling the stud extension $e'$, acts to hold these parts in such locking engagement. The signal arm A is further provided with a handle $v$, by means of which the driver may move the signal arm laterally on the stud $e$, so as to disengage the pintle extension $r'$ from one of the holes $t$. The arm may then be rotated so as to place the signal in any position desired, whereupon the device will automatically lock itself in such position.

The signal B is operated in a similar manner, but from a point of control located nearer the driver. For this signal, a bracket $w$ is mounted on the dashboard $a$. Slidably and rotatably mounted in said bracket $w$ is a shaft $x$, having fixed on one end a lever arm $x'$ and on the other end a handle knob $x^2$. The handle $x^2$ is provided with a stud $x^3$, and a member $w'$ of the bracket is made with a plurality of arcuate holes $w^2$, with which the stud $x^3$ is adapted to engage. A compression coil-spring $y$ normally holds the device in the position shown in Fig. 2. A lever arm $z$ is fixed on the tube $d$ of the signal arm B, and a link $z'$ connects the lever arms $x'$ and $z$. In this way, an operation of the handle knob $x^2$ will transmit corresponding motion to the signal B.

It will thus be seen that the driver may readily set the signals to any selected position, and such signals will indicate clearly the intention of the driver.

I claim:

1. An auto signaling device comprising a pivoted tube having transparent openings at its ends, an illuminating element in said tube, and a weighted shutter adapted to permit all of the openings to be illuminated when the tube is in certain positions, and to exclude light from certain of the openings when the tube is in other positions.

2. An auto signaling device comprising a pivoted tube having transparent openings at its ends, an illuminating element in said tube, a weighted shutter adapted to permit all of the openings to be illuminated when the tube is in certain positions and to exclude light from certain of the openings when the tube is in other positions, and controlling means for setting and locking the signal in any selected position.

SAMUEL E. GILBERT.